L. BURK.
HOG SCRAPING MACHINE.
APPLICATION FILED FEB. 15, 1911.

1,036,959.

Patented Aug. 27, 1912.

2 SHEETS—SHEET 1.

WITNESSES:

INVENTOR
Louis Burk
BY

L. BURK.
HOG SCRAPING MACHINE.
APPLICATION FILED FEB. 15, 1911.
1,036,959.
Patented Aug. 27, 1912.
2 SHEETS—SHEET 2.
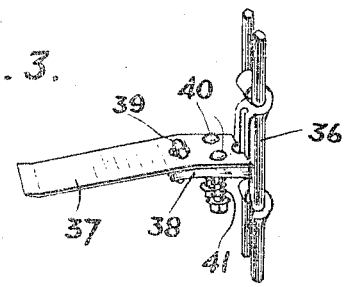
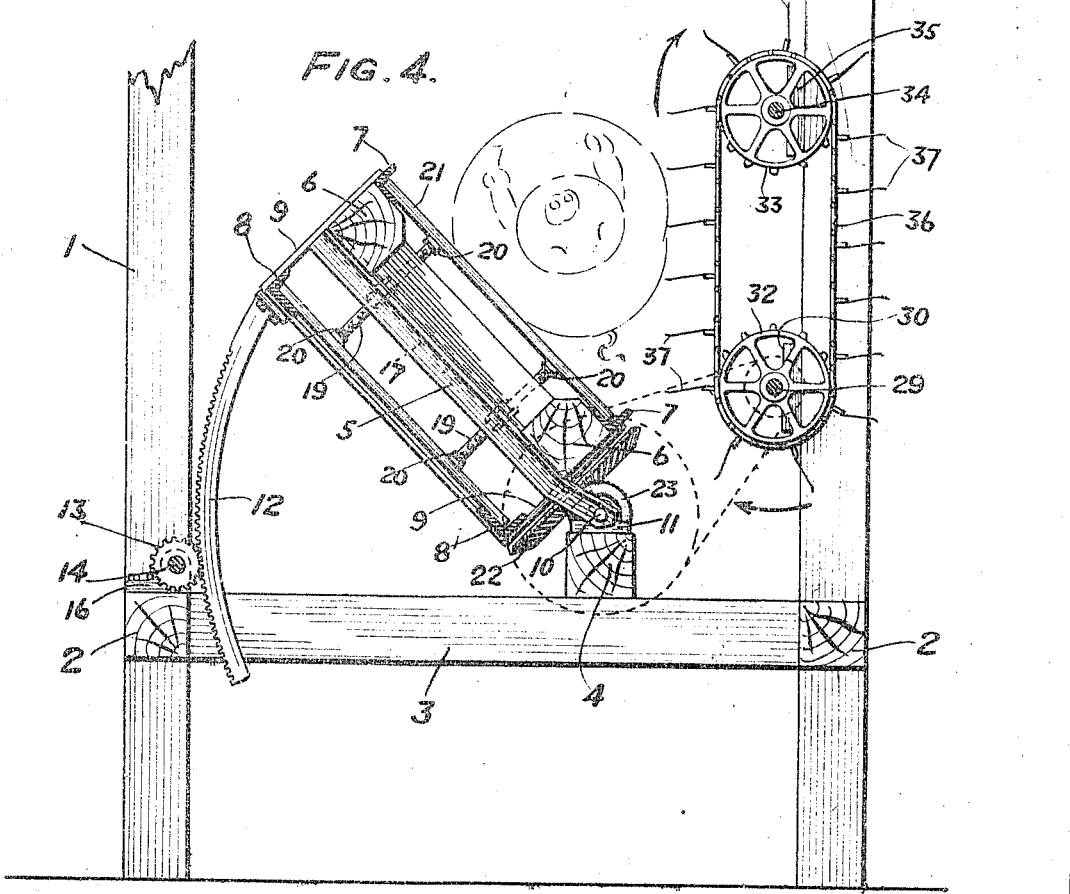
WITNESSES:
INVENTOR
Louis Burk
BY
Chas. N. Butler
ATTORNEY

UNITED STATES PATENT OFFICE.

LOUIS BURK, OF PHILADELPHIA, PENNSYLVANIA.

HOG-SCRAPING MACHINE.

1,036,959.

Specification of Letters Patent.

Patented Aug. 27, 1912.

Application filed February 15, 1911. Serial No. 608,719.

*To all whom it may concern:*

Be it known that I, LOUIS BURK, a citizen of the United States, residing in the city of Philadelphia, county of Philadelphia, and State of Pennsylvania, have invented a new and useful Improvement in Hog-Scraping Machines, of which the following is a specification.

My invention is a scraping machine designed for de-hairing hogs rapidly, conveniently and effectively.

A leading object of the invention is to provide means by which carcasses can be carried in succession along constantly moving scrapers and simultaneously adjusted to the desired positions, being turned automatically so as to present the different parts of the body to the scrapers.

The characteristic features of the invention are fully disclosed in the following description and the accompanying drawings in illustration thereof.

Figure 1:
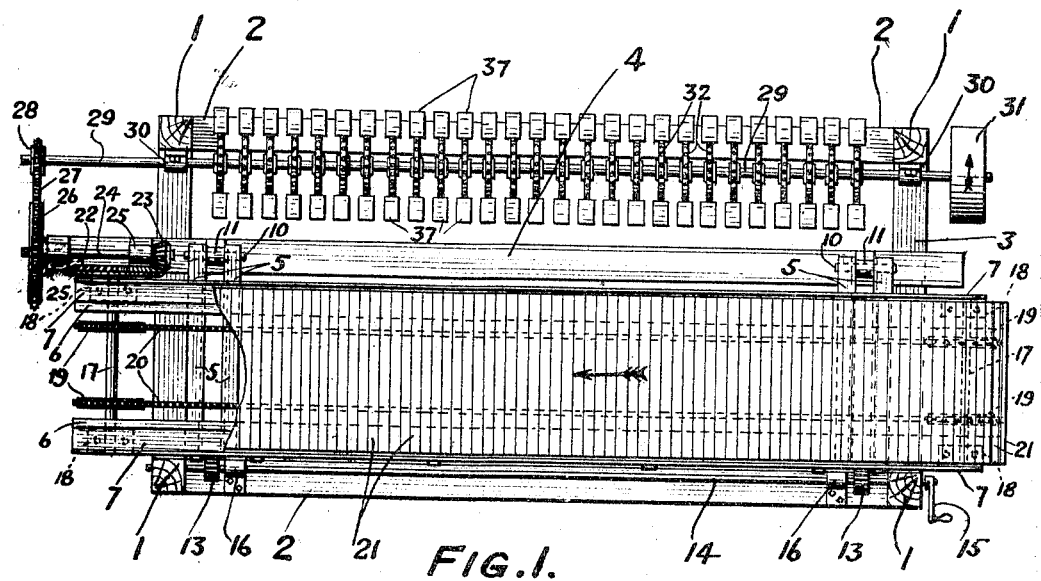
Figure 2:
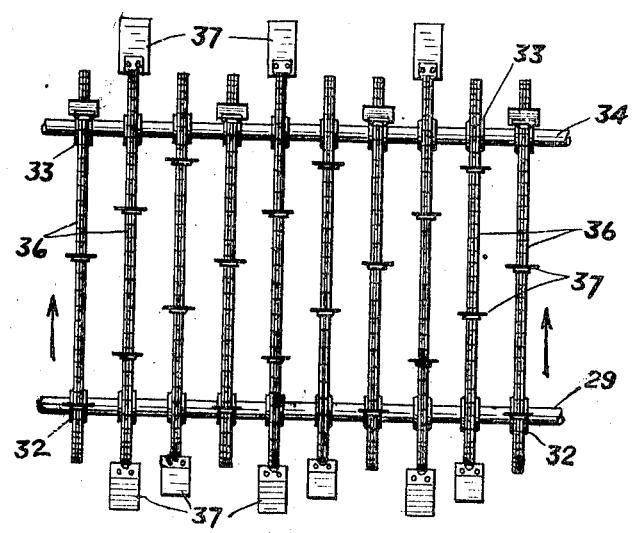

In the drawings, Figure 1 is a plan view of mechanism embodying improvements of my invention, parts being broken away to illustrate features of the construction; Fig. 2 is a sectional elevation of the scraping mechanism proper; Fig. 3 is a perspective view of a section of sprocket chain or link belt with a scraper attached thereto; and Fig. 4 is a sectional end elevation of the machine.

The apparatus illustrated in the drawings comprises a frame consisting of the posts 1, the connecting beams 2 and 3, and a sill 4 supported by the beams 3. A bed is formed by the cross beams 5, the parallel sills 6 supported by and fixed to the beams, the parallel angles 7 supported on and fixed to the sills, the parallel angles 8 disposed beneath the sills, and the tie plates 9 which connect the angles 8 with the previously described bed members. The beams 5 are pivotally connected, by pintles 10, with the bearings 11 on the sill 4, and the bed is adjusted to the desired inclination by racks 12 fixed thereto and pinions 13 engaging the racks, the pinions being fixed on a shaft 14 turned by a handle 15 thereon in the bearings 16. Shafts 17 are journaled in the bearings 18 carried by the sills 6, sprocket wheels 19 are fixed on these shafts, sprocket chains or link belts 20 are carried by the wheels, and slats 21, forming a flexible floor of a moving platform, are carried by the chains. A beveled gear 22 is fixed to one of the shafts 17 and is driven, to move the flexible floor, by an engaging beveled pinion 23 on the shaft 24 journaled in the bearings 25, the beveled gears retaining their engagement throughout the movement of the bed on its fulcrums. A sprocket wheel 26 is fixed on the shaft 24 and is engaged by a sprocket chain 27 with a sprocket wheel 28 fixed on a shaft 29, the latter being journaled in bearings 30 carried by uprights 1 and revolved by a pulley 31 fixed to it, whereby the platform is moved through the intermediate mechanism described. Sprocket wheels 32 are fixed at intervals on the shaft 29, and sprocket wheels 33 are fixed at intervals on a shaft 34 which is journaled in bearings 35 on the uprights which carry the bearings 30. Link belts 36 pass over and are carried by their respective pairs of sprocket wheels 32 and 33, links of the respective belts having fixed thereto the flexible sheet metal scrapers 37.

The links which carry the scrapers have the laterally projecting bearing members 38 thereon to which the scrapers 37 are connected by bolts 39 and 40, the bolts having sufficient play to permit the scrapers a limited movement on their bearings as a lever moves on its fulcrum. The bolts 40 are extended a sufficient distance beyond their respective bearings to permit the interposition of springs 41 between the bearings and the nuts of the bolts, by which they are engaged, the springs being adjustable in tension by adjusting the nuts, whereby flexibility is provided to permit the scrapers to operate to adapt the action to the work and prevent straining the scrapers by excessive resistance in the path thereof.

In operation, the pulley 31 is revolved in the direction of the arrow thereon, the floor 21 is moved in the direction of its arrow, and the carcasses placed in succession on the floor are carried transversely to the scrapers which move upwardly in contact therewith. The bed is given such inclination that the carcasses are so placed in relation to the scrapers that they will tend to move into the path thereof and will be turned thereby to permit the scrapers to engage and scrape the entire body.

Having described my invention I claim:

1. A scraping machine comprising a hinged bed, in combination with traveling scrapers adapted for de-hairing a body carried by said bed, said bed being adjustable to different angles with relation to the course of travel of said scrapers.

2. A scraping apparatus comprising a hinged bed adjustable angularly, a traveling platform carried thereby, and traveling scrapers adapted for acting on a body carried by said platform.

3. A scraping machine comprising a hinged bed, a shaft journaled in said bed, a traveling platform carried by said bed, means whereby said shaft moves said platform, a beveled gear fixed to said shaft, a beveled gear engaging said gear first named and having its axis of revolution substantially in the axis of oscillation of said bed, scraping mechanism comprising a revoluble shaft, and means whereby said last named shaft and beveled gear are connected and operated in unison.

4. A scraping machine comprising a belt having a bearing member projecting therefrom, a scraper carried by said bearing, means comprising a bolt whereby said scraper is engaged in rocking relation to said bearing and a spring for limiting the rocking movement of said scraper.

5. A scraping machine comprising an inclined traveling platform and a belt having vertically moving scrapers thereon adjacent the lower edge of said platform whereby a body is maintained thereon and scraped.

6. A scraping machine comprising a body having parallel shafts journaled therein, a flexible platform carried by said shafts, a pair of journaled shafts extending in the direction of movement of said platform, a belt carried by said last named shafts and having scrapers thereon, and means for operating said shafts in unison and moving said scrapers upwardly against a body carried by said platform.

In witness whereof I have hereunto set my name this 13th day of February, 1911, in the presence of the subscribing witnesses.

LOUIS BURK.

Witnesses:
A. B. DIETRICH,
W. H. BAKER.